United States Patent Office 3,280,104
Patented Oct. 18, 1966

3,280,104
2',3'-DIDEOXYRIBONUCLEOSIDE AND 2',3'-DIDEOXYRIBONUCLEOTIDE DERIVATIVES
John Gilbert Moffatt, Palo Alto, Calif., and Klaus E. Pfitzner, Göttingen, Germany, assignors to Syntex Corporation, Panama, Panama, a corporation of Panama
No Drawing. Filed Apr. 13, 1964, Ser. No. 359,469
15 Claims. (Cl. 260—211.5)

This invention relates to novel nucleoside and nucleotide derivatives and to methods for their preparation.

More particularly, this invention relates to novel 2',3'-dideoxyribonucleoside and 2',3'-dideoxyribonucleotide derivatives represented by the general formula:

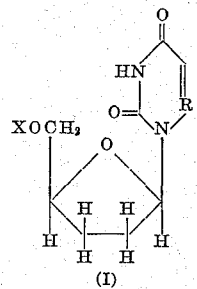

(I)

In this formula R represents the grouping

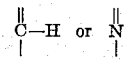

while X represents hydrogen, a salt of a phosphoryl

group, e.g., an ammonium salt, an alkali metal salt, such as lithium, sodium or potassium salt, an alkaline earth metal salt, such as barium, strontium or calcium salt, and the like, or a phosphoramidate group, i.e.:

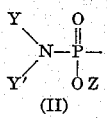

(II)

wherein Y represents hydrogen or a lower alkyl group, e.g., methyl, ethyl, propyl, buty, hexyl, and the like; Y' represents hydrogen or an aliphatic, alicyclic, aromatic hydrocarbon or heterocyclic group containing up to 30 carbon atoms; Y and Y' taken together with the nitrogen atom to which they are attached can represent a heteroalkylidene group containing up to 8 carbon atoms, and Z represents a salt-forming radical, e.g., one of those mentioned herein above in connection with the phosphoryl group, an amine-di(lower alkyl) carboxamidine or amine-dicycloalkylcarboxamidine salt, such as a 4-morpholine-N,N'-dicyclohexylcarboxamidine salt, or the like.

Included among the aliphatic, alicyclic and aromatic hydrocarbon groups which can be represented by Y' are alkyl (including saturated and unsaturated, straight and branched-chain alkyl and cycloalkyl) and aryl (including alkaryl and aralkyl) groups, such as methyl, ethyl, propyl, decyl, cetyl, allyl, methallyl, cyclobutyl, cyclopentyl, isopropyl, n-butyl, sec-butyl, amyl, hexyl, heptyl, octyl, phenyl, tolyl, xylyl and benzyl groups, and the like, as well as fused ring structures such as bornyl, nor-bornyl, 1-adamantyl, indanyl, indenyl, naphthyl, acenaphthyl, phenanthryl and cyclopentanopolyhydrophenanthryl, e.g., androstanyl, androstenyl, pregnanyl, pregnenyl, cholesteryl, and the like, all of which can either be unsubstituted or substituted with one or more non-interfering substituents, e.g., hydroxyl groups; hydroxyl derivatives, such as alkoxy, e.g., methoxy, and acyloxy, e.g., acetoxy groups; nitro groups, amino groups, including alkylamino groups such as methylamino, dimethylamino and diethylamino groups; halogens, e.g., fluorine or chlorine, carbonyl derivatives, such as enol ether and ketal groups, and the like.

Included among the heterocyclic groups which can be represented by Y' are substituted and unsubstituted furfuryl, tetrahydropyranyl, thienyl, thiazolyl, pyridyl, pyrrolidyl, piperidyl, indolyl, dihydroindolyl, quinuclidyl and quinolyl groups, and the like.

Included among the heteroalkylidene groups which can be represented by Y and Y' together with the nitrogen atom to which they are attached are morpholinyl, pyrrolidinyl, piperidinyl, 2-methylpiperidinyl, 3-methylpiperidinyl, 4-methylpiperidinyl, 2-ethylpiperidinyl, 3-ethylpiperidinyl, and the like.

The novel 2',3'-dideoxyribonucleosides represented by Formula I above (X=hydrogen) are prepared from the corresponding 2'-deoxyribonucleosides by a method which can be represented schematically as follows:

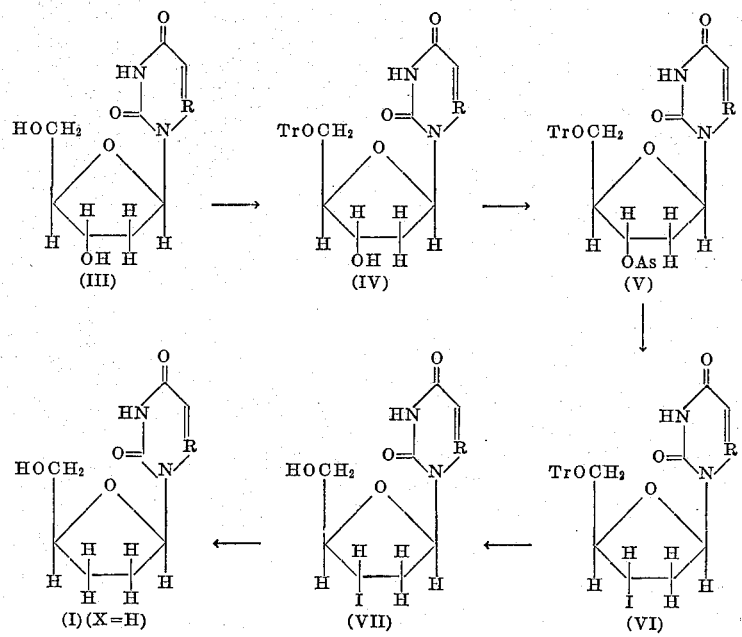

In these formulas R has the same meaning as set forth hereinabove for Formula I, Tr represents a trityl (triphenylmethyl) group, and As represents an alkylsulfonyl or arylsulfonyl group, e.g., methanesulfonyl, benzenesulfonyl, p-toluenesulfonyl, and the like.

The 2'-deoxyuridine and 2'-deoxy-6-azauridine employed as starting materials in this procedure are readily available or else can be prepared by general chemical or enzymatic synthetic methods of combining a pyrimidine moiety with a deoxyribofuranose group, e.g., methods such as those shown by Pontis et al., Bichem. Biophys. Acta, 51, 138 (1961), by Fox et al., J. Am. Chem. Soc., 83, 4066 (1961), and by Sörm et al., Coll. Czech. Chem. Comm. 28, 2588 (1963).

In the first step of this method of preparing 2',3'-dideoxyribonucleosides from the corresponding 2'-deoxyribonucleosides, the starting material (III), e.g., 2'-deoxyuridine, having a primary hydroxyl group at the 5'-position and a secondary hydroxyl group at the 3'-position, is tritylated to etherify the 5'-hydroxyl group without disturbing the 3'-hydroxyl group, i.e., to form the corresponding 2'-deoxy-5'-0-tritylribonucleoside (IV), e.g., 2'-deoxy-5'-0-trityluridine. This can be accomplished by reacting the starting material with trityl chloride in anhydrous pyridine at a temperature from about 70° C. to about 100° C. for from about 20 minutes to about 60 minutes.

Next, this 5'-trityl ether is reacted with an aliphatic or aromatic sulfonyl chloride, e.g., methanesulfonyl chloride, benzene sulfonyl chloride, p-toluenesulfonyl chloride, or the like, preferably under anhydrous conditions in an inert organic solvent, such as pyridine, collidine, or the like, at low temperature, e.g., at 0° C. overnight, to provide the corresponding aliphatic or aromatic sulfonyl derivative (V), e.g., 2'-deoxy-3'-0-mesyl-5'-0-trityluridine.

The 3'-aliphatic or -aromatic sulfonyl derivative, dissolved in an inert organic solvent, e.g., acetone, 1,2-dimethoxyethane, and the like, is then reacted with an alkali metal iodide, such as sodium iodide or the like, preferably under anhydrous conditions, at reflux temperature for from about 2 to 6 hours, to form the corresponding 2',3'-dideoxy-3'-iodo-5'-0-tritylribonucleoside (VI), e.g., 2',3'-dideoxy-3'-iodo-5'-0-trityluridine.

This 2',3'-dideoxy-3'-iodo-5'-0-tritylribonucleoside intermediate is then detritylated, preferably by reacting it with aqueous acetic acid at reflux temperature for from about 5 to 60 minutes, to give the corresponding 2',3'-dideoxy-3'-iodoribonucleoside (VII), e.g., 2',3'-dideoxy-3'-iodouridine.

In the final step in the reaction scheme outlined hereinabove, the 2',3'-dideoxy-3'-iodoribonucleoside intermediate is hydrogenated to remove the iodine atom and give the corresponding 2',3'-dideoxyribonucleoside (I; X=hydrogen), e.g., 2',3'-dideoxyuridine. This is preferably accomplished by first dissolving the 2',3'-dideoxy-3'-iodoribonucleoside in a lower alkanol, such as methanol, ethanol, or the like, containing from about 1 to about 10 molar equivalents, and preferably a molar excess of about 2 or more molar equivalents, of a strong base, e.g., ammonia or a trialkylamine such as triethylamine, or the like, then adding from about 5% to about 25% by weight, based on the weight of the nucleoside intermediate, of a hydrogenation catalyst, e.g., 5% palladium-on-charcoal, palladized barium sulfate, or the like, and finally passing hydrogen through the resulting suspension, preferably at atmospheric pressure and room temperature (about 25° C.), until approximately one molar equivalent of hydrogen has been absorbed.

The novel 2',3'-dideoxyribonucleosides of Formula I hereinabove (X=hydrogen) can be converted to the corresponding 5'-phosphate salts by any of a number of general methods of forming nucleoside 5'-monophosphate salts. Thus, for example, the 2',3'-dideoxyribonucleoside, e.g., 2',3'-dideoxyuridine, can be reacted with phosphorus oxychloride, dibenzylphosphorochloridate, tetra-p-nitrophenyl pyrophosphate or 0-benzylphosphorus-0,0'-diphenyl phosphoric anhydride, using procedures known to those skilled in the art. Preferably, however, the nucleoside will be phosphorylated by reacting, it at room temperature in anhydrous pyridine, with 2-cyanoethyl phosphate in the presence of a di(lower alkyl)- or dicycloalkylcarbodiimide, e.g., dicyclohexylcarbodiimide or the like, in the manner described by Iener in J. Am. Chem. Soc., 83, 159 (1961). Since the glycosidic bond in the thus-formed 2',3'-dideoxyribonucleoside-5' - phosphates is extremely acid-sensitive, these compounds are recovered from the reaction medium in the form of a salt rather than as the free acids.

These 2',3'-dideoxyribonucleoside-5' - phosphate salts are readily converted to the corresponding phosphoramidate salt derivatives

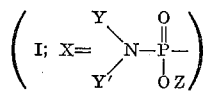

by methods such as that described by Moffatt et al. in J. Am. Chem. Soc., 83, 649 (1961). Briefly stated, this method simply involves refluxing a solution of the 2',3'-dideoxyribonucleoside-5' - phosphate salt, e.g., barium 2',3'-dideoxyuridine-5'-phosphate, with about 5 equivalents of a di(lower alkyl)- or dicycloalkylcarbodiimide, preferably dicyclohexylcarbodiimide, and about 5 equivalents of a primary or secondary amine, e.g., morpholine, in 67% aqueous t-butanol, to provide the corresponding 2',3'-dideoxyribonucleoside-5'-phosphoramidate salts, e.g., the 4-morpholine-N,N'-dicyclohexylcarboxamidinium salt of 2',3'-dideoxyuridine-5' - phosphoromorpholidate. Inasmuch as these phosphoramidate salts are also extremely acid-sensitive, they are recovered from the reaction medium as such, i.e., as salts, rather than as the free phosphoramidates.

Included among the amines which can be employed in preparing these phosphoramidate salt derivatives are aliphatic, alicyclic, aromatic hydrocarbon and heterocyclic primary and secondary amines containing up to 30 carbon atoms, and more particularly alkyl (including saturated and unsaturated, straight- and branched-chain alkyl and cycloalkyl) and aryl (including alkaryl and aralkyl) primary and secondary amines such as methylamine, ethylamine, β-ethoxyethylamine, propylamine, butylamine, amylamine, octylamine, cetylamine, dimethylamine, diethylamine, dibutylamine, dioctylamine, allylamine, cyclohexylamine, cyclohexenylamine, aniline, p-toluidine, p-anisidine, morpholine, piperidine, β-pyridylamine, benzylamine, bornylamine, naphthylamine, phenanthrylamine, 17β-amino-$\Delta^5$-androsten-3β-ol, 7α - aminocholesterol, 16α-cyclohexylaminopregnan-20-one, and the like.

The compounds represented by Formula I hereinabove, i.e., the 2',3'-dideoxyribonucleosides, the corresponding 5'-phosphate salts, and the corresponding 5'-phosphoramidate salts, exhibit antimetabolic and antibacterial activity against a wide variety of organisms, including *Staphylococcus aureus, Proteus vulgaris, Klebsiella pneumoniae* and *Escherichia coli*.

In order that those skilled in the art can more fully understand the present invention, the following examples are set forth. These examples are given solely for the purpose of illustrating the invention, and should not be considered as expressing limitations unless so set forth in the appended claims.

*Example 1*

4.56 grams of 2'-deoxyuridine and 6.67 grams of triphenylmethyl chloride were added to 50 ml. of anhydrous pyridine, and the resulting reaction mixture was then heated to 100° C. and held at that temperature for 45 minutes. Following this reaction period the reaction mixture was poured into water and the resulting precipitate was collected and dried under vacuum. Recrystallization of the resulting residue from acetone/benzene (1:10, respectively) gave a 75% yield of 2'-deoxy-5'-0-trityluridine, melting point 204–5° C.

Anal.—Calc'd for $C_{28}H_{26}N_2O_5$: C, 71.47; H, 5.57; N, 5.95. Found: C, 71.60; H, 5.61; N, 5.98.

By repeating this procedure in every detail but one, namely, replacing 2'-deoxyuridine with 2'-deoxy-6-azauridine, the coresponding 5'-trityl ether, i.e., 2'-deoxy-5'-0-trityl-6-azauridine, was obtained.

Example II

A mixture of 5 grams of 2'-deoxy-5'-0-trityluridine and 50 cc. of anhydrous pyridine was cooled to 0° C., and 2.5 cc. of methanesulfonyl chloride were then added. The resulting reaction mixture, maintained under substantially anhydrous conditions by excluding moisture therefrom, was kept at 0° C. for 18 hours. Following this reaction period, 1 cc. of ice water was added to the reaction mixture. The resulting mixture was kept at 0° C. for 1 hour, then poured with vigorous stirring into 500 cc. of ice water, whereupon a white precipitate formed. This precipitate was collected by filtration, then washed with water and dried under vacuum ($10^{-3}$ mm. Hg) for 15 hours at 60° C., thus giving substantially quantitative yield of 2'-deoxy-3'-0-mesyl-5'-0-trityluridine.

By replacing 2'-deoxy-5'-0-trityluridine in this procedure with 2'-deoxy-5'-0-trityl-6-azauridine, keeping all other factors constant, 2'-deoxy-3'-0-mesyl-5'-0-trityl-6-azauridine was obtained.

Example III

To a solution of 6 grams of 2'-deoxy-3'-0-mesyl-5'-0-trityluridine in 50 cc. of 1,2-dimethoxyethane (which had been purified prior to use by distillation from lithium aluminum hydride), there was added 3.5 grams of sodium iodide. The resulting reaction mixture was then refluxed for 5 hours. Following this reaction period the reaction mixture was filtered to remove sodium mesylate, and the filtrate was then evaporated to dryness under vacuum. One hundred cc. of water were then added to the residue, the residue was partitioned between 100 ml. of water and 100 ml. of methylene chloride and the organic phase was then chromatographed on silicic acid to separate 2',3'-dideoxy-3'-iodo-5'-0-trityluridine from a small amount of unreacted 2'-deoxy-3'-0-mesyl-5'-0-trityluridine. The latter compound, when again refluxed with an excess of sodium iodide in 1,2-dimethoxyethane in the manner just described, was also converted to the iodonucleoside, thus giving a 64% overall yield of this product, melting point 138–140° C.

Anal.—Calc'd for $C_{28}H_{25}IN_2O_4$: C, 57.45; H, 4.34; N, 4.83; I, 21.87. Found: C, 57.36; H, 4.42; N, 4.65; I, 21.40.

By repeating this procedure in every detail but one, namely, replacing 2'-deoxy-3'-0-mesyl-5'-0-trityluridine with 2'-deoxy-3'-0-mesyl-5'-0-trityl-6-azauridine, 2',3'-dideoxy-3'-iodo-5'-0-trityl-6-azauridine was obtained.

Example IV

Five grams of 2',3'-dideoxy-3'-iodo-5'-0-trityluridine were added to 35 cc. of aqueous 80% acetic acid, and the resulting reaction mixture was then heated at 100° C. for 45 minutes. Following this reaction period the reaction mixture was evaporated to dryness under vacuum, and the resulting residue was crystallized from methylene chloride/ethyl acetate (1:1, respectively). The mother liquor was purified on a silicic acid column, with the trityl alcohol being eluated with methylene chloride/ethyl acetate (1:1) and the product with ethyl acetate. An overall yield of 62% of 2',3'-dideoxy-3'-iodouridine, melting point 161° C., was obtained.

Anal.—Calc'd for $C_9H_{11}IN_2O_4$: C, 31.95; H, 3.29; N, 8.28. Found: C, 32.15; H, 3.47; N, 8.11.

This procedure was then repeated in every detail but one, namely, 2',3'-dideoxy-3'-iodo-5'-0-trityluridine was replaced by 2',3'-dideoxy-3'-iodo-5'-0-trityl-6-azauridine to give 2',3'-dideoxy-3'-iodo-6-azauridine.

Example V

To a solution of 0.73 gram of 2',3'-dideoxy-3'-iodouridine and 0.7 cc. of triethylamine in 100 ml. of aqueous 50% methanol there was added 200 mg. of 5% palladium-on-charcoal hydrogenation catalyst. Next, hydrogen gas was bubbled through the catalyzed suspension, at room temperature (25° C.) and atmospheric pressure, for 15 minutes. Following this reaction period the suspension was filtered to remove the catalyst, and then passed through a column containing Dowex 2 (8% cross-linked polystyrene) ion-exchange resin in the bicarbonate form. After washing the column with water and evaporating the combined eluate and washings to dryness, the resulting residue was crystallized from acetone/petroleum ether to give 2',3'-dideoxyuridine, melting point 116° C., in 87% yield.

Anal.—Calc'd for $C_9H_{12}N_2O_4$: C, 50.90; H, 5.70; N, 13.20. Found: C, 50.81; H, 5.75; N, 13.22.

By repeating this procedure in every detail but one, namely, replacing 2',3'-dideoxy-3'-iodouridine with 2',3'-dideoxy-3'-iodo-6-azauridine, 2',3'-dideoxy-6-azauridine was obtained.

Example VI

A solution of 212 mg. of 2',3'-dideoxyuridine and 302 mg. of 2-cyanoethyl phosphate in 10 ml. of pyridine was concentrated under vacuum at 30° C. to an oil. Next, this oil was added to 20 ml. of anhydrous pyridine, and the resulting solution was evaporated to dryness, whereupon this procedure was repeated with a fresh 20 ml. portion of anhydrous pyridine. Ten ml. of anhydrous pyridine and 1.2 grams of N,N'-dicyclohexylcarbodiimide were then added to the resulting dry residue, and the reaction vessel was tightly sealed and allowed to stand at room temperature for 48 hours.

Following this reaction period 3 ml. of water were added to the reaction mixture, and the resulting solution was allowed to stand at room temperature for 30 minutes. The solution was then concentrated to dryness under vacuum to remove the pyridine, and the resulting residue was dissolved in 10 ml. of water and filtered to remove dicyclohexylurea. The dicyclohexylurea was thoroughly washed with an additional 10 ml. of water, and the filtrate and washings were then combined, mixed with 20 ml. of aqueous 1 N sodium hydroxide solution, and heated at reflux for 45 minutes to destroy excess 2-cyanoethyl phosphate. The refluxed solution was cooled and then passed through a column of Dowex 50 ($H^+$; sulfonated polystyrene beads; 8% cross-linked) ion-exchange resin to remove sodium ions. Next, the pH of the solution was rapidly adjusted to 7.5 with barium hydroxide, and barium phosphate was then removed therefrom by centrifugation. The barium phosphate was washed with water and the washings returned to the solution.

The addition of two volumes of ethanol to the solution precipitated chromatographically and electrophoretically pure barium 2',3'-dideoxyuridine-5'-phosphate, which was then added to an additional crop of product obtained by reworking the mother liquors. The combined product was dried by washing with ethanol, then with acetone, then with ether, and finally by removing traces of solvent under vacuum, thus giving barium 2',3'-dideoxyuridine-5'-phosphate tetrahydrate in an overall yield of 78%; P/uracil=1.05.

By replacing 2',3'-dideoxyuridine in this procedure with 2',3'-dideoxy-6-azauridine, keeping all other factors constant, barium 2',3'-dideoxy-6-azauridine-5'-phosphate was obtained.

Example VII

A solution of 824 mg. of N,N'-dicyclohexylcarbodiimide in 15 ml. of t-butanol was added dropwise, over a 4 hours period, to a refluxing solution of 310 mg. of 2',3'-dideoxyuridine-5'-phosphate dissolved in a mixture of 10 ml. of water, 10 ml. of t-butanol and 348.5 mg. of purified morpholine. The reaction mixture was then refluxed for several hours more, until electrophoresis at pH 7.5 [carried out in an apparatus of the type described by Markham et al. Biochem. J., 52, 522 (1952), using 0.05M triethylammonium bicarbonate as the buffer] showed only a single spot with a mobility roughly one-half that of the nucleotide starting material.

The reaction mixture was then cooled to room temperature and the crystalline material therein was removed by filtration and washed with t-butanol. Next, the filtrate was evaporated under vacuum (at about 1 mm. pressure, using a rotary type evaporator) until the t-butanol was largely removed. The remaining aqueous phase was then extracted three times with ether. Next, the clear aqueous solution was evaporated under vacuum and the last traces of water were removed, using an oil pump. The resulting glassy residue was then transferred as a solution in the minimum volume of methanol to a 50 ml. centrifuge tube, and the volume of methanol was carefully reduced under vacuum to about 3 ml.

At this point, the addition of 35 ml. of dry ether precipitated a gummy solid which, on trituration with fresh, dry ether, changed to a white powder. After a final wash with fresh, dry ether, the product was dried under vacuum at 100° C. to give 2',3'-dideoxyuridine-5'-phosphoromorpholidate as the 4-morpholine N,N'-dicyclohexylcarboxamidinium salt.

By repeating this procedure in every detail but one, namely, replacing 2',3'-dideoxyuridine-5'-phosphate with a equivalent amount of 2',3'-dideoxy-6-azauridine-5'-phosphate, 2',3'-dideoxy-6-azauridine-5'-phosphoromorpholidate was obtained as the 4-morpholine N,N'-dicyclohexylcarboxamidinium salt.

Similarly, by replacing morpholine with equivalent amounts of methylamine, octylamine, diethylamine, cyclohexylamine, piperidine, p-anisidine, benzylamine, bornylamine and 17β-amino-Δ⁵-androsten-3β-ol and using both 2',3'-dideoxyuridine-5'-phosphate and 2',3'-dideoxy-6-azauridine-5'-phosphate as the nucleotide starting material, the corresponding phosphoramidates, namely, 2',3'-dideoxyuridine-5'-phosphoromethylamidate;
2',3'-dideoxy-6-azauridine-5'-phosphoromethylamidate;
2',3'-dideoxyuridine-5'-phosphorooctylamidate;
2',3'-dideoxy-6-azauridine-5'-phosphorooctylamidate;
2',3'-dideoxyuridine-5'-phosphorodiethylamidate;
2',3'-dideoxy-6-azauridine-5'-phosphorodiethylamidate;
2',3'-dideoxyuridine-5'-phosphorocyclohexylamidate;
2',3'-dideoxy-6-azauridine-5'-phosphorocyclohexylamidate;
2',3'-dideoxyuridine-5'-phosphoropiperidate;
2',3'-dideoxy-6-azauridine-5'-phosphoropiperidate;
2',3'-dideoxyuridine-5'-phosphoro-p-anisidate;
2',3'-dideoxy-6-azauridine-5'-phosphoro-p-anisidate;
2',3'dideoxyuridine-5'-phosphorobenzylamidate;
2',3'-dideoxy-6-azauridine-5'-phosphorobenzylamidate;
2',3'-dideoxyuridine-5'-phosphorobornylamidate;
2',3'-dideoxy-6-azauridine-5'-phosphorobornylamidate;
2',3'-dideoxyuridine-5'-phosporo-Δ⁵-androsten-3-β-ol-17β-amidate and
2',3'-dideoxy-6-azauridine-5'-phosphoro-Δ⁵-androsten-3β-ol-17β-amidate, respectively, were obtained in the form of the corresponding amine-dicyclohexylcarboxamidinium salt.

It will be obvious to those skilled in the art that other changes and variations can be made in carrying out the present invention without departing from the spirit and scope thereof as defined in the appended claims.

We claim:
1. A compound of the following formula

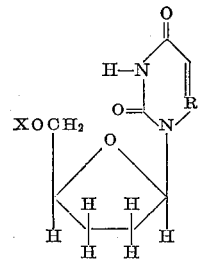

wherein R is a member selected from the group consisting of

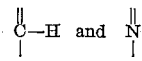

and X is a member selected from the group consisting of hydrogen; an ammonium alkali metal, and alkaline earth metal salt of the phosphoryl group characterized by the formula

and a phosphoramidate group characterized by the formula

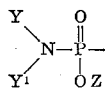

wherein Y is a member selected from the group consisting of hydrogen and lower alkyl; $Y^1$ is a member selected from the group consisting of hydrogen and an aliphatic, alicyclic, aromatic and heterocyclic group containing up to 30 carbon atoms; Y and $Y^1$ taken together with the nitrogen atom to which they are attached is a heteroalkylidene group of up to 8 carbon atoms; and Z is a member selected from the group consisting of ammonium, alkali metal, alkaline earth metal, an amine-di(loweralkyl)carboxamidine and an amine-dicycloalkylcarboxamidine.

2. A compound according to claim 1 wherein X is hydrogen.

3. compound according to claim 1 wherein X is a member selected from the group consisting of an ammonium, alkali metal, and alkaline earth metal salt of the phosphoryl group characterized by the formula

4. A compound according to claim 3 wherein X is the sodium salt of said phosphoryl group and R is

5. A compound according to claim 3 wherein X is the potassium salt of said phosphoryl and R is

6. A compound according to claim 4 wherein R is

7. A compound according to claim 5 wherein R is

8. A compound according to claim 1 wherein X is a phosphoramidate group and R is

9. A compound according to claim 8 wherein R is

10. 2′,3′-dideoxyuridine.
11. 2′,3′-dideoxy-6-azauridine.
12. Barium 2′,3′-dideoxyuridine-5′-phosphate.
13. Barium 2′,3′-dideoxy-6-azauridine-5′-phosphate.
14. The 4-morpholine N,N′-dicyclohexylcarboxamidinium salt of 2′,3′-dideoxyuridine-5′-phosphoromorpholidate.
15. The 4-morpholine N,N′-dicyclohexylcarboxamidinium salt of 2′,3′-dideoxy-6-azauridine-5′-phosphoromorpholidate.

References Cited by the Examiner

UNITED STATES PATENTS

| | | | |
|---|---|---|---|
| 3,079,379 | 2/1963 | Tanaka et al. | 260—211.5 |
| 3,155,646 | 11/1964 | Hunter | 260—211.5 |
| 3,171,833 | 3/1965 | Sorm et al. | 260—211.5 |

OTHER REFERENCES

Dahlgard et al., "Jour. Org. Chem.," volume 25, No. 5, May 1960, pages 781–783.

Dutton et al., "Biochem. Jour.," vol. 75, 1960, pp. 230–235.

Heidelberger et al., "Jour. Amer. Chem. Soc.," vol. 84, September 1962, pp 3597–3598.

LEWIS GOTTS, *Primary Examiner.*

JOHNNIE R. BROWN, *Assistant Examiner.*